US012179375B2

(12) United States Patent
Gistas Perez et al.

(10) Patent No.: US 12,179,375 B2
(45) Date of Patent: Dec. 31, 2024

(54) CUTTING PRINT MEDIA

(71) Applicant: Hewlett-Packard Development Company, L.P., Spring, TX (US)

(72) Inventors: Angel Gistas Perez, Sant Cugat del Valles (ES); Jose Angel Garcia Fernandez, Sant Cugat del Valles (ES); Javier Garcia Blanco, Sant Cugat del Valles (ES); Joseba Ormaechea Saracibar, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 447 days.

(21) Appl. No.: 16/977,263

(22) PCT Filed: Apr. 30, 2018

(86) PCT No.: PCT/US2018/030156
§ 371 (c)(1),
(2) Date: Sep. 1, 2020

(87) PCT Pub. No.: WO2019/212473
PCT Pub. Date: Nov. 7, 2019

(65) Prior Publication Data

US 2021/0001502 A1 Jan. 7, 2021

(51) Int. Cl.
*B26D 1/04* (2006.01)
*B26D 5/02* (2006.01)
(Continued)

(52) U.S. Cl.
CPC ............... *B26D 1/045* (2013.01); *B26D 5/02* (2013.01); *B26D 5/20* (2013.01); *B26D 9/00* (2013.01); *B41J 11/68* (2013.01); *B41J 11/70* (2013.01)

(58) Field of Classification Search
CPC . B41J 11/66; B41J 11/70; B41J 11/663; B41J 11/68; B41J 11/706; B26D 2011/005; B26D 1/01; B26D 1/015; B26D 1/02; B26D 1/025; B26D 1/03; B26D 1/035; B26D 1/04; B26D 1/045; B26D 1/12; B26D 1/125; B26D 1/14; B26D 1/141;
(Continued)

(56) References Cited

U.S. PATENT DOCUMENTS 3,657,952 A * 4/1972 Brockbank ............ B26D 1/185 83/563
4,094,474 A * 6/1978 Stollenwerk ........... B65H 75/28 242/532.5
(Continued)

FOREIGN PATENT DOCUMENTS

CA 2591091 5/2008
CN 203382291 1/2014
(Continued)

*Primary Examiner* — Evan H MacFarlane
(74) *Attorney, Agent, or Firm* — Jordan IP Law, LLC

(57) ABSTRACT

Examples of print media cutting procedures and devices are described. The print media is cut with a first cutting module while the print medium is advanced through the device. The print media is then reversed before being cut with a second cutting module. The first cutting module can be moved laterally at the same time as the print medium is moved in the reverse direction.

15 Claims, 12 Drawing Sheets

(51) Int. Cl.

| | |
|---|---|
| ***B26D 5/20*** | (2006.01) |
| ***B26D 9/00*** | (2006.01) |
| ***B41J 11/68*** | (2006.01) |
| ***B41J 11/70*** | (2006.01) |

(58) Field of Classification Search

CPC ........ B26D 1/143; B26D 1/1435; B26D 1/15; B26D 1/151; B26D 1/205; B26D 1/225; B26D 1/24; B26D 1/245; B26D 1/26; B26D 1/265; B26D 1/28; B26D 1/285; B26D 5/20; B26D 5/26; B26D 7/2628; B26D 7/2635; B26D 9/00; B26D 11/00; B65H 35/00; B65H 35/0006; B65H 35/0073; B65H 35/008; B65H 35/0086; B65H 35/02; B65H 35/04; B65H 35/06; B65H 35/08

USPC ........................................................... 83/408

See application file for complete search history.

(56) References Cited

U.S. PATENT DOCUMENTS

| | | | | | |
|---|---|---|---|---|---|
| 4,784,318 | A * | 11/1988 | Bay | G03D 15/046 | 234/2 |
| 5,120,290 | A * | 6/1992 | Bay | B26D 5/30 | 83/483 |
| 5,303,624 | A * | 4/1994 | Ventham | B26D 5/18 | 83/485 |
| 5,911,530 | A * | 6/1999 | Hinojosa | B26D 5/08 | 400/621 |
| 6,260,457 | B1 * | 7/2001 | Hakkaku | B41J 11/666 | 400/621 |
| 6,408,750 | B1 * | 6/2002 | Goto | B26D 7/22 | 400/621 |
| 6,454,475 | B2 | 9/2002 | Giles et al. | | |
| 6,554,511 | B2 * | 4/2003 | Kwasny | B26D 5/02 | 400/621 |
| 7,100,484 | B2 | 9/2006 | Maddalon | | |
| 7,410,315 | B2 | 8/2008 | Nakayama | | |
| 8,020,979 | B2 | 9/2011 | Silverbrook | | |
| 8,061,828 | B2 | 11/2011 | Silverbrook | | |
| 8,701,535 | B2 | 4/2014 | Endo et al. | | |
| 8,827,580 | B2 | 9/2014 | Nowak et al. | | |
| 8,866,861 | B2 | 10/2014 | Schuh | | |
| 8,967,073 | B2 | 3/2015 | Wakita | | |
| 9,498,983 | B1 * | 11/2016 | Goto | B41J 11/703 | |
| 10,384,478 | B2 * | 8/2019 | Opfer | B41F 13/60 | |
| 2003/0118389 | A1 | 6/2003 | Kwasny et al. | | |
| 2004/0177736 | A1 | 9/2004 | Fukushima et al. | | |
| 2005/0051011 | A1 | 3/2005 | Onishi et al. | | |
| 2005/0248644 | A1 * | 11/2005 | Ahne | B26D 7/26 | 347/101 |
| 2008/0238996 | A1 * | 10/2008 | Takada | B26F 1/3806 | 347/37 |
| 2009/0007744 | A1 | 1/2009 | Maddalon | | |
| 2013/0023006 | A1 | 1/2013 | Medioni | | |
| 2014/0013908 | A1 * | 1/2014 | Kobayashi | B26D 3/14 | 83/40 |
| 2014/0150618 | A1 * | 6/2014 | Fujihara | B26D 7/26 | 83/401 |
| 2014/0274643 | A1 | 9/2014 | Clark et al. | | |
| 2018/0281218 | A1 * | 10/2018 | Urrutia Nebreda | B41J 11/66 | |
| 2021/0237487 | A1 * | 8/2021 | Hayakawa | B26D 1/1575 | |
| 2022/0040949 | A1 * | 2/2022 | Mizutani | B26D 1/405 | |

FOREIGN PATENT DOCUMENTS

| | | | | |
|---|---|---|---|---|
| JP | 2007062363 | | 3/2007 | |
| KR | 200302044 | * | 1/2003 | D04D 9/00 |
| TW | 201543863 | | 11/2015 | |

* cited by examiner

CUTTING PRINT MEDIA

BACKGROUND

Some printers are capable of printing large format images on print media supplied on a roll. Large format printed output may take various forms including, for example: posters, vehicle decal, banners, signage, prints for framing, billboards, stickers and external artworks.

Print jobs sent to a large format printer may vary in size. Some printers include cutting devices to cut print media supplied on a roll to a size that matches the size of the print job.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

Certain examples described herein allow high quality cutter systems to be deployed efficiently to cut media such as print media jobs. In particular, certain examples allow cutter systems to cut print media jobs efficiently, with reduced wastage, so that, for example, more print jobs can be created from a given amount of print media.

Certain examples also allow cuts to be made in print media whilst reducing the risk of print media damage during the cutting procedure. Certain examples also allow cuts to be made in print media while reducing the risk of damage to the cutters themselves. This in turn can prolong the lifetime of the cutters and/or the cutting system, or reduce the servicing burden associated maintaining or replacing cutters in cutting systems.

These effects can be achieved, for example, by the use of a cutting procedure in which a first cutter performs a first cut, the print medium is moved in a reverse direction, and at the same time the first cutter moves in a transverse or lateral direction relative to the reverse direction. Example methods, as described herein, allow the first cutter to perform a high quality first cut, and in addition avoid damage to the print medium or the first cutter as it moves in the reverse direction by the action of the lateral or transverse movement of first cutter. After being moved in the reverse direction, the print medium may be cut by a second cutter which performs a second cut across the print media aligned with the first cut.

In certain examples, the first cutter can be moved laterally back to its original position after the print medium is reversed in order to flatten the print medium before the second cutter performs the second cut. This can have the effect of improving the quality of the second cutting operation. In examples described herein, the first and second cuts are generally perpendicular cuts in longitudinal (vertical) and transverse (horizontal) directions respectively, the longitudinal direction being the direction of the media path.

Certain examples described herein may be used to improve on existing methods of cutting that cut across the print media first before performing a second cut. These examples may allow for the print media to be advanced by a traction device positioned in a media path before the first and second cutters without the need for additional traction devices integrated with the first and/or second cutters, or after the first and/or second cutters. This in turn can reduce the cost, complexity, and/or size of a cutting system.

Figure 1A:
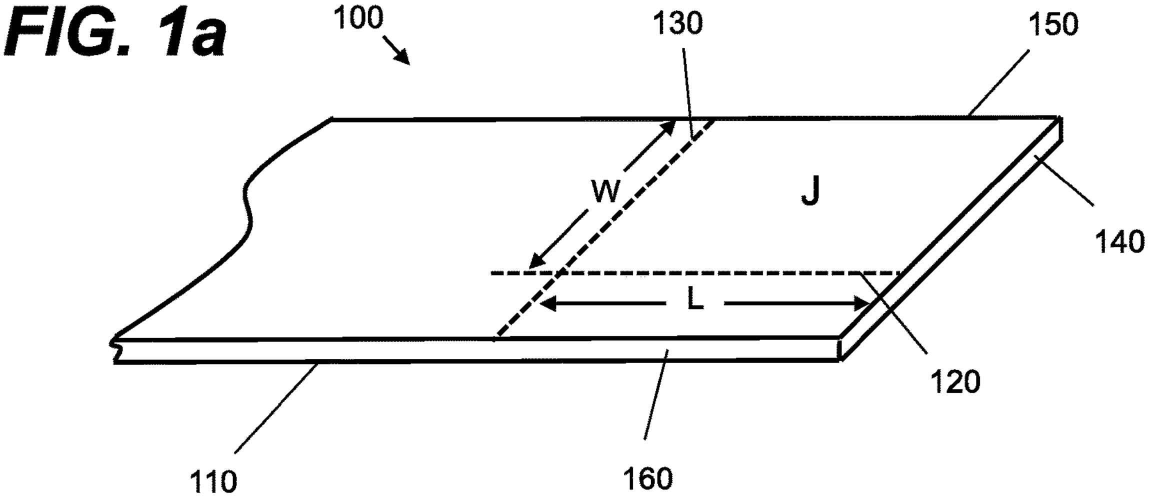
FIG. 1*a* is a perspective view of a print medium job with two cut lines according to an example.

FIG. 1*a* shows an example 100 of a print medium job J formed from a print media. In FIG. 1*a*, the print media comprises a continuous print media 110. Continuous print media comprises a substrate for printing where consecutive sheets for printing are coupled, e.g. via a web of media. A continuous print media may be supplied from a roll or from a stack of folded media. A roll may comprise a spindle around which is wound layers of print media. The continuous print media may be a continuous sheet having a width and a length, where the length is much greater than the width (e.g. by one or two orders of magnitude). In other examples, the print media may comprise an individual sheet of print media or multiple individual sheets of print media.

The print media 110 in FIG. 1*a* has a leading edge 140 and two lateral edges 150, 160. When viewed down the length of the print media from the leading edge 140, the lateral edges comprise a right edge 150 and a left edge 160. The leading edge 140 is generally perpendicular to the lateral edges 150, 160.

In FIG. 1*a*, the print medium job is formed by cutting the print media 110 along two cut lines 120 and 130. The first cut line 120 extends from the leading edge 140 of the print media 110 in a direction parallel with the length of the continuous print media i.e. in a generally longitudinal direction along the print media. The lateral or transverse position of the cut line 120 begins and is maintained at a constant distance W from the right hand edge 150 of the print media. This constant distance W defines a width of the print medium job J.

The second cut line 130 extends between the two lateral edges 150, 160 in a generally transverse direction across the print media. The second cut line is maintained at a constant distance L from the leading edge 140 of the print media 110. The distance L is shorter than the length of the first cut line 120 such that the second cut line 130 intersects the first cut line 120. In another example, the distance L may be the same or almost the same as the length of the first cut. The constant distance L defines a length of the print medium job J. It is noted that the length L may be longer or shorter than the width W of the print job. As can be seen in FIG. 1*a*, the general shape of the print medium job J is rectangular with two adjacent edges formed from the leading and right edges 140, 150 of the print media 110, and the other two adjacent edges formed by the first and second cut lines 120, 130.

Figure 1B:
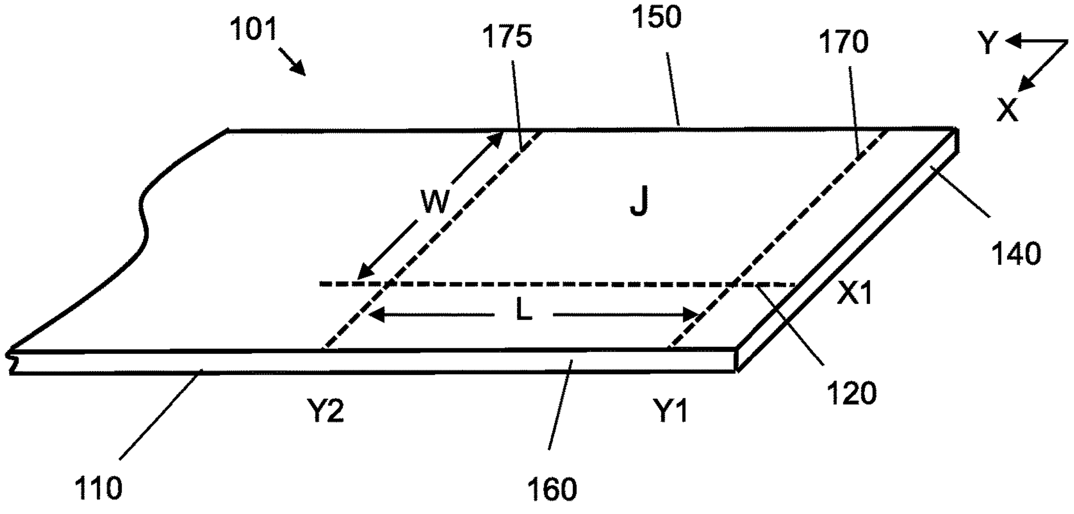
FIG. 1*b* is a perspective view of a print medium job with three cut lines according to an example.

FIG. 1*b* shows an example 101 of a print medium job J formed from a print media by cutting the print media 110 along three cut lines 120, 170 and 175. The first cut line 120 is similar to FIG. 1*a* and extends from the leading edge 140 in a generally longitudinal direction along the print media 110. The longitudinal direction is indicated in FIG. 1*b* as a Y-axis with the transverse direction indicated as an X-axis. The first cut line is set at a distance X1 from the right hand edge 150 of the print media which also corresponds with the width W of the print job J. The second and third cut lines 170, 175 are generally perpendicular to the first cut line 120 and extend transversely across the print media in the X-axis direction. The second cut line 175 is set at a distance Y1 from the leading edge 140 of the print media, and the third cut line 175 is set at a greater distance Y2 from the leading edge 140. The second cut line creates a new edge for the print medium job and separates or trims the leading edge 140 from the print medium job J. The distance between the second and third cut lines 170, 175 defines the length of the print medium job J and is equal to the difference between the value Y2 and Y1 (i.e. Y2 minus Y1).

Figure 1C:
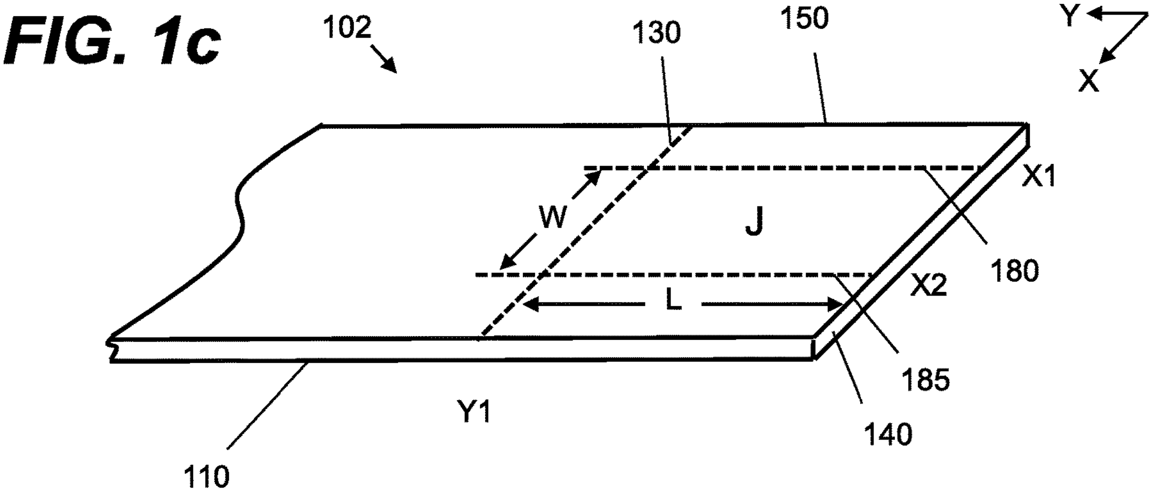
FIG. 1*c* is a perspective view of a print medium job with three cut lines according to an example.

FIG. 1*c* shows an example 102 of a print medium job J formed from a print media by cutting the print media 110 along three cut lines 130, 180 and 185. The first cut line 130 is similar to FIG. 1*a* and extends in a generally transverse direction across the print media 110. The first cut line is set at a distance Y1 from the leading edge 140 of the print media which also corresponds with the length L of the print medium job J. The second and third cut lines 180, 185 are generally perpendicular to the first cut line 120 and extend from the leading edge 140 in a generally longitudinal direction along the print media 110. The second and third cut lines 180, 185 are set at a distances X1 and X2 from the right hand edge 150 of the print media, and the distance between the lines (X2 minus X1) defines the width W of the print medium job J.

Figure 1D:
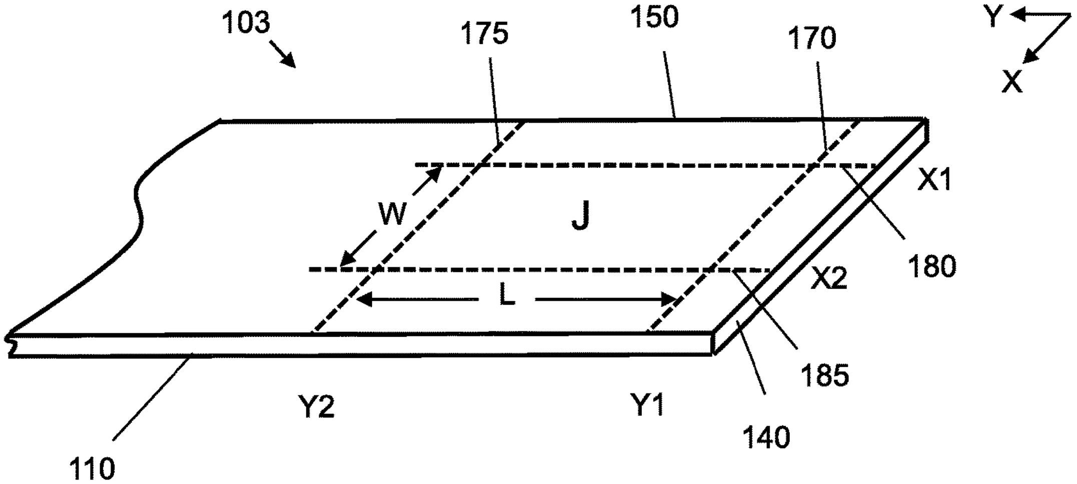
FIG. 1*d* is a perspective view of a print medium job with four cut lines according to an example.

FIG. 1*d* shows an example 103 of a print medium job J formed from a print media by cutting the print media 110 along four cut lines 170, 175, 180 and 185. The first and second cut lines 170, 175 are similar to FIG. 1*b* and each extend in a generally transverse direction across the print media 110, while the third and fourth cut lines 180, 185 are similar to FIG. 1*c* and each extend in a generally longitudinal direction from the leading edge 140. The four cut lines 170, 175, 180 and 185 define the four edges of the print medium job J, and the distance between the cut lines defined the length L and width W of the print medium job J.

In the examples of FIGS. 1*a* to 1*d*, the print medium jobs J can be associated with a printing operation that creates a print image on the area of the print medium job J. The print image may be contained within the cut lines, or may extend over the cut lines. In an example, a print medium job J including the print image and the cut lines may be defined in a data file which is sent to a printer with an integrated cutting system. In another example, a print image for a print medium job may be defined in one data file, and cut lines for a print medium job may be defined in another data file.

Figure 2:
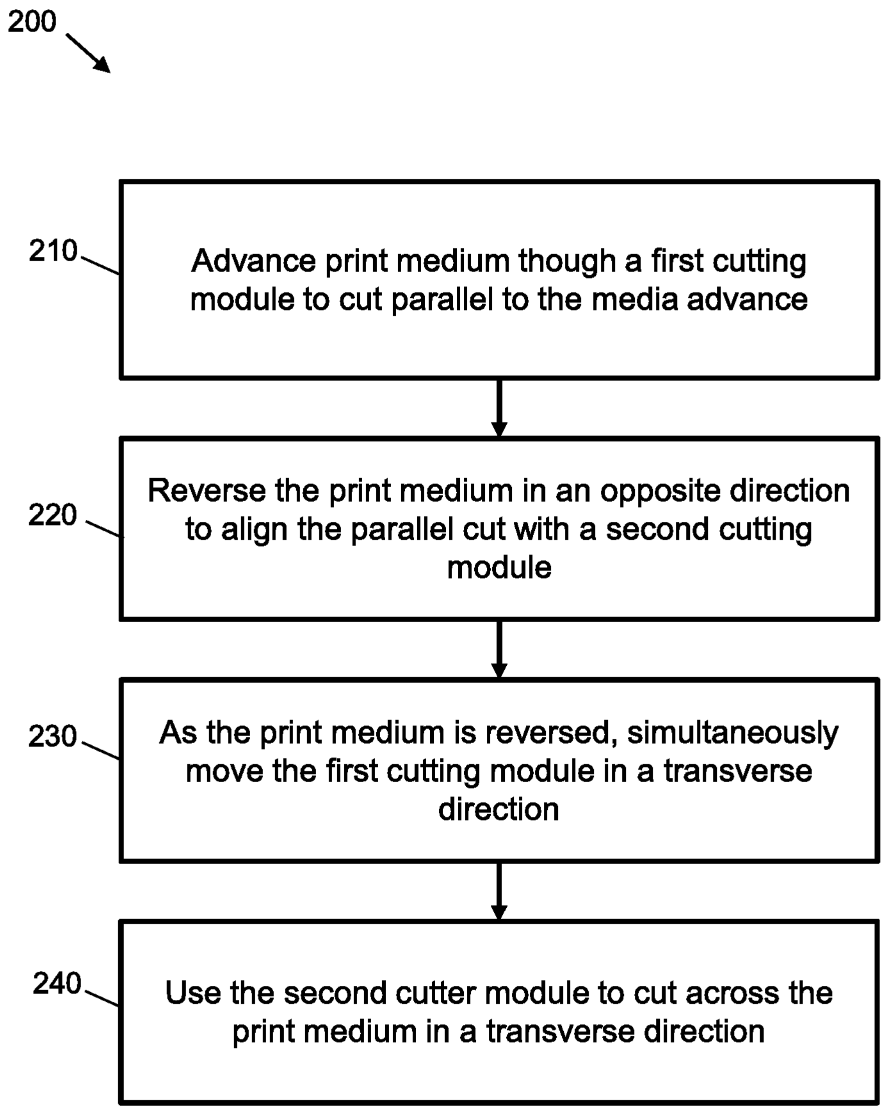
FIG. 2 is a flow diagram showing a cutting procedure according to an example.

Various types of print media are available including, for example, paper-based, card-based, vinyl-based, fabric-based or acetate-based for various applications including, for example, posters, vehicle decal, banners, signage, prints for framing, billboards, stickers and external artworks FIG. 2 is a flow diagram showing a cutting procedure according to an example. Reference is also made to the example cutting system shown schematically in the side views of FIGS. 3*a* to 3*e*. The cutting procedure will be described in relation to a print medium job that involves two generally perpendicular cuts, for example, the two-cut print medium job of FIG. 1*a*. It will be apparent that the cutting procedure can also be extended to print medium jobs that involve more than two cuts such as the print medium jobs of FIGS. 1*b*, 1*c*, and 1*d*.

The cutting procedure begins at block 210 in which the print medium is advanced through a first cutting module to form a cut that is parallel to the media advance direction. During this first block 210, the first cutting module is maintained generally in the same position, although it can be positioned beforehand so that the cut is made along an appropriate cutting line for the print medium job.

Figure 3A:
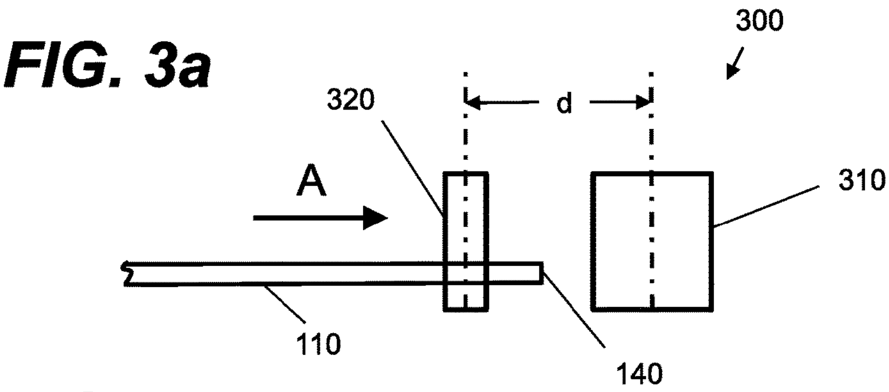
FIGS. 3*a* to 3*e* are schematic side views of a cutting system following a cutting procedure according to an example.
Figure 3B:
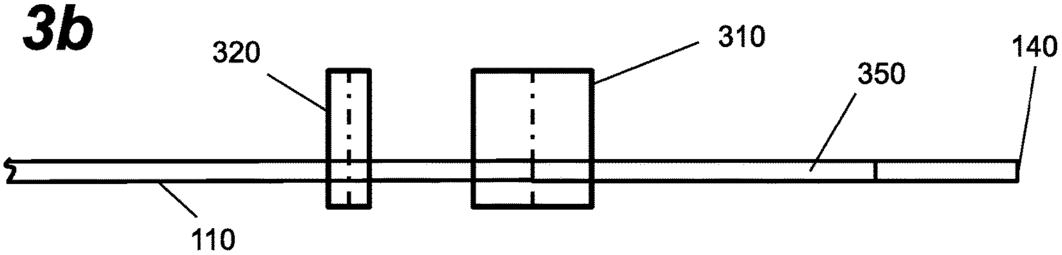

Referring to FIG. 3*a*, the example cutting system 300 comprises a first cutting module 310 and a second cutting module 320. The print medium 110 is advanced along a print media path in the direction indicated by the arrow A. The second cutting module 320 is positioned along the print media path before the first cutting module 310, and is separated by a distanced in the media advance direction. This separation allows the cutting modules to operate independently of one another in generally perpendicular directions. In practice, the distance d may be relatively short distance compared to the length of a print job. For example, a print job may have a length of 1,000 mm while the distance d may be 30 mm. In FIG. 3*a*, the print medium 110 has a leading edge 140 that has already passed the position of the second cutting module 320 and is heading towards the first cutting module 310. As the leading edge of the print medium passes through the first cutting module 310, it will engage with the first cutting module which acts to cut the print medium in a generally vertical plane. The cut formed by the first cutting module will extend linearly from the leading edge along the length of the print medium as the print medium continues to advance along the print media path. Once the desired length of the first cut has been reached by operation of the first cutting module and the advancing of the print medium, the advance of the print medium will be stopped. The first cut is now complete as shown in FIG. 3*b*. The extent of the first cut is illustrated in FIG. 3*b* by the cross-hatching 350 on the print medium 110.

Referring again to FIG. 2, the example procedure moves to block 220 in which the print medium is reversed in an opposite direction from the medium advance direction in order to align the second cutting module with the first cut.

Figure 3C:
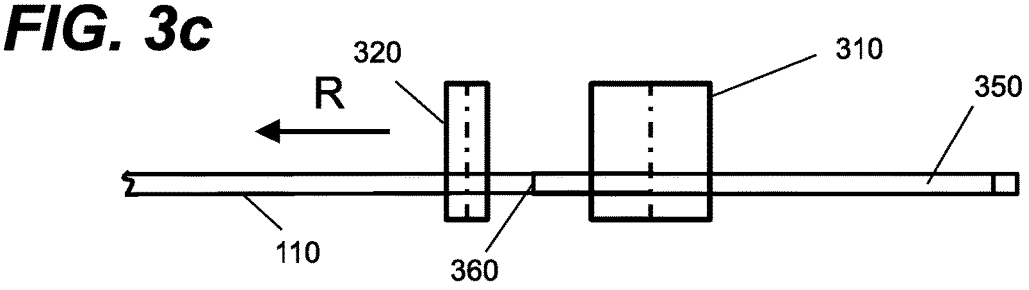

Referring to the example in FIG. 3*c*, the process of reversing the print medium 110 is indicated by the arrow R in a direction opposite to the medium advance direction A. The process moves the print medium back along the media path. In FIG. 3*c*, the end 360 of the first cut can be seen approaching the second cutting module 320.

In an example, the first cutting module 310 is designed and configured to cut in one linear direction. The process of reversing the print medium may cause the first cutting module 310 to damage the cut edges of the print medium since the cutting module in this example is not designed to operate in the reverse direction. Retracting the first cutting module 310 in a vertical direction may also cause damage to the print medium including the cut edges.

Referring again to FIG. 2, the example procedure in block 230 performs an additional action of moving the first cutting module in a transverse direction at the same time as the print medium is reversed. The movement of the print medium in the reverse direction is performed in parallel with movement of the first cutting module in the transverse direction. The movement of the first cutting module may be directly proportional to the movement of the print medium in the reverse direction. In certain examples, the reverse movement of the print medium and the transverse movement of the first cutting module do not begin at the same but nevertheless overlap in time. In certain examples, the reverse movement of the print medium and the transverse movement of the first cutting module do not end at the same but nevertheless overlap in time. In certain examples, the reverse movement of the print medium and the transverse movement of the first cutting module substantially overlap in time.

Figure 3D:
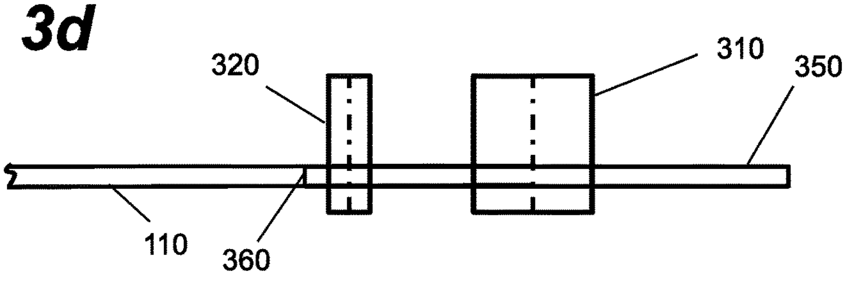

Referring to the example in FIG. 3*d*, the process of reversing the print medium back along the print media path is complete and the end 360 of the first cut is positioned so that the first cut aligns with the second cutting module 320. In other examples, the first cut may align with the second cutting module 320 when the end 360 of the first cut is positioned adjacent to the cutting line of the second cutting module 320. The reversing process is now interrupted so that the print medium is held in a stationary position within the cutting system. In certain examples, the first cutting module may be moved back to its original position by an opposite transverse movement. This allows any bending of the print media to be flattened prior to any further cutting operation.

Referring again to FIG. 2, the example procedure moves to block 240 in which the second cutting module cuts across the print medium in a transverse direction. In an example, the transverse direction of the second cut is perpendicular to the longitudinal direction of the first cut.

Figure 3E:
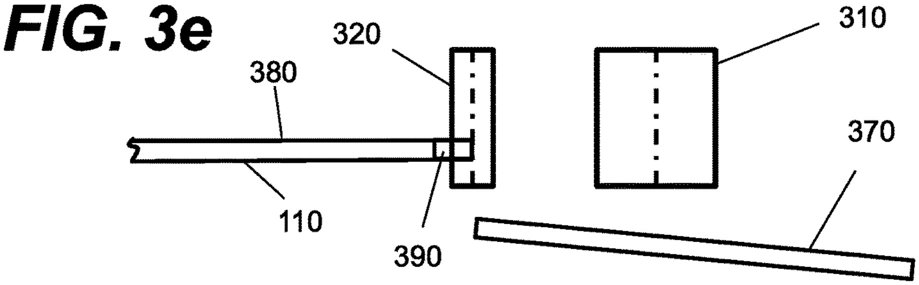

Referring to the example in FIGS. 3*d* and 3*e*, the process of cutting across the print medium using the second cutting module 320 comprises moving the second cutting module 320 in a direction into the page and engaging with the print medium so that the module acts to cut the print medium in a generally vertical plane. In examples, this transverse cutting process is performed while the print medium is held stationary. The result of the second cut is to separate the front part 370 of the print medium from the bulk or remainder 380 of the print medium as illustrated in FIG. 3*e*. In certain examples, the front part 370 may contain the print medium job and may also contain other waste media from the cutting operation. In FIG. 3*e*, the front part 370 is shown dislodged from the remainder 380 of the print medium, and may fall to an output interface of the cutting system such as an output tray.

In certain examples, after the first and second cuts have been completed, the first cutting module may be moved again in the transverse direction or in the opposite transverse direction to help encourage the separation and/or dislodgement of a print medium job from the remaining print media.

FIGS. 4*a* to 4*f* are schematic plan views of a cutting system according to an example. An example cutting procedure is shown in stages from FIG. 4*a* to FIG. 4*f*.

Figure 4A:
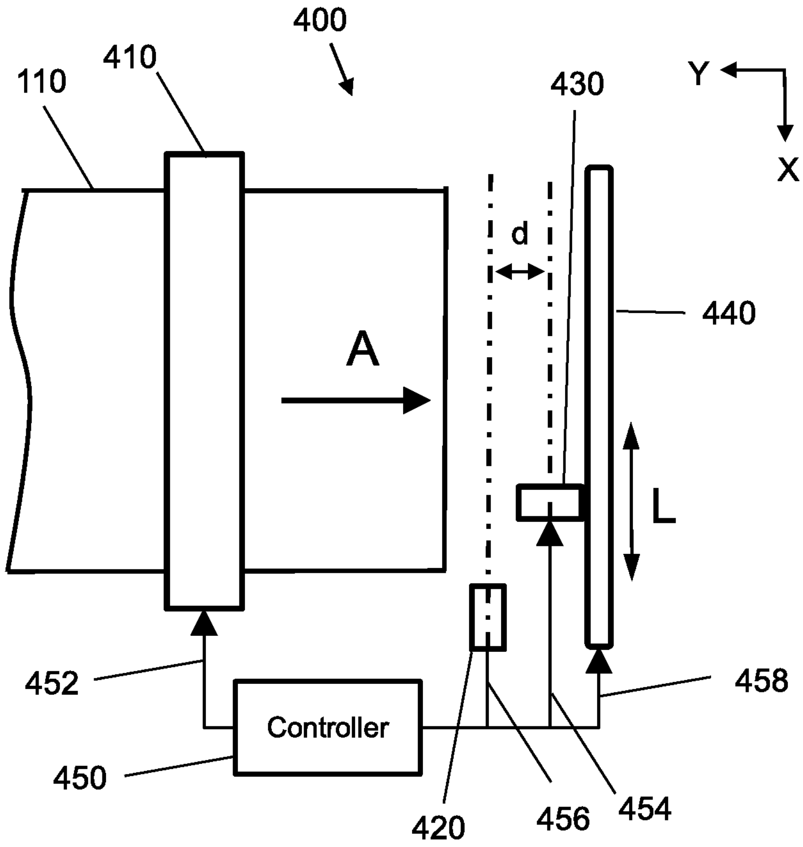
FIGS. 4*a* to 4*f* are schematic plan views of a cutting system following a cutting procedure according to an example.

As shown in FIG. 4*a*, the cutting system 400 comprises a traction system 410 for advancing print media 110 along a print media path as indicated by the arrow A. The traction system is also capable or reversing the print media back along the print media path. The traction system may comprise a pair of nip rollers driven by an electric motor. The print media can be advanced or retracted in a longitudinal direction i.e. along the axis Y in FIG. 4*a*. The cutting system 400 also comprises a first cutting module 430 for cutting the print media linearly in the Y axis direction, and a second cutting module 420 for cutting the print media linearly in transverse direction across the media path i.e. along the X axis in FIG. 4*a*. The first and second cutting modules 420, 430 are separated along the Y axis by a distance d. This allows the second cutting module to move across the print media path without being obstructed by the first cutting module 430.

Figure 7:
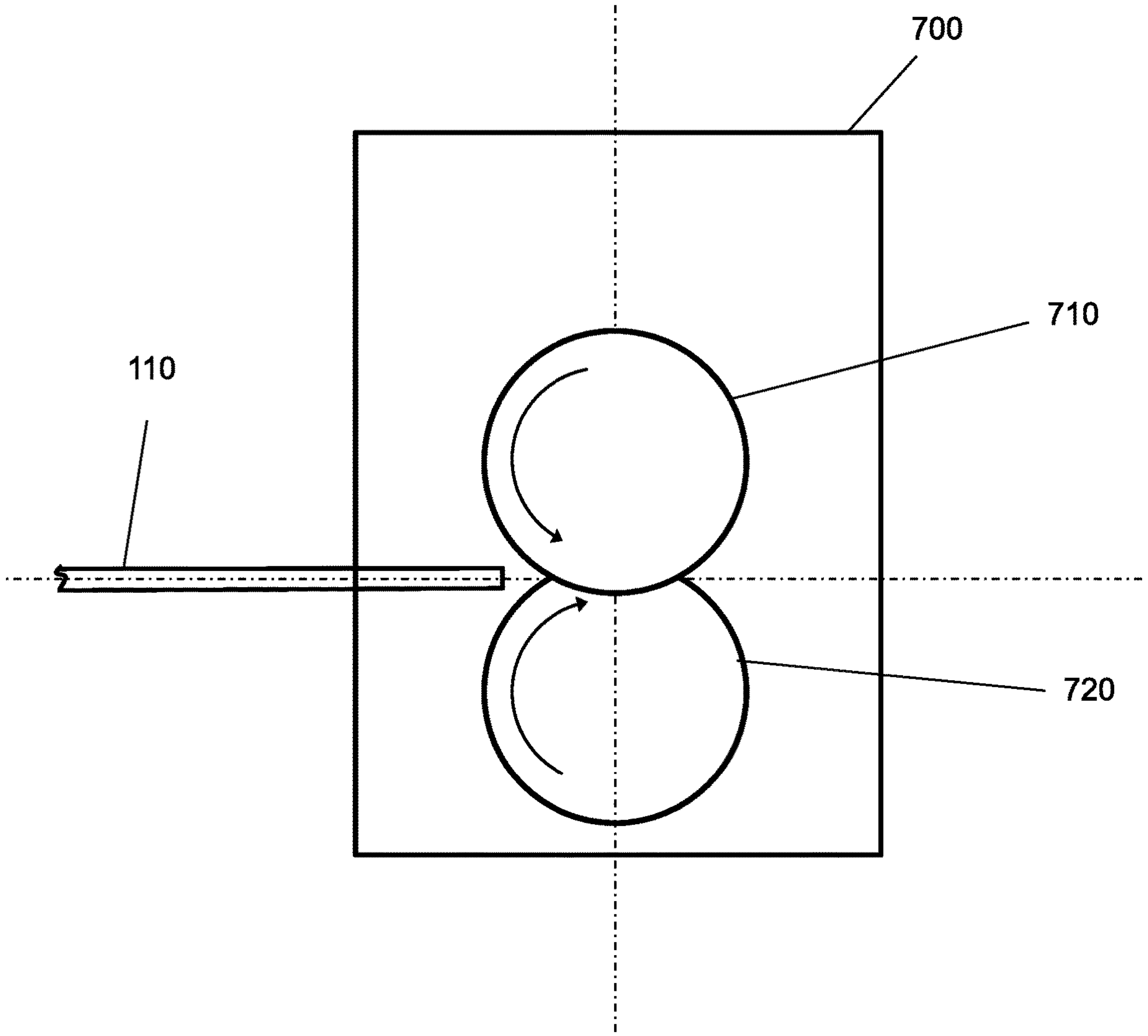
FIG. 7 is a schematic side view of a cutting module according to an example.
Figure 8:
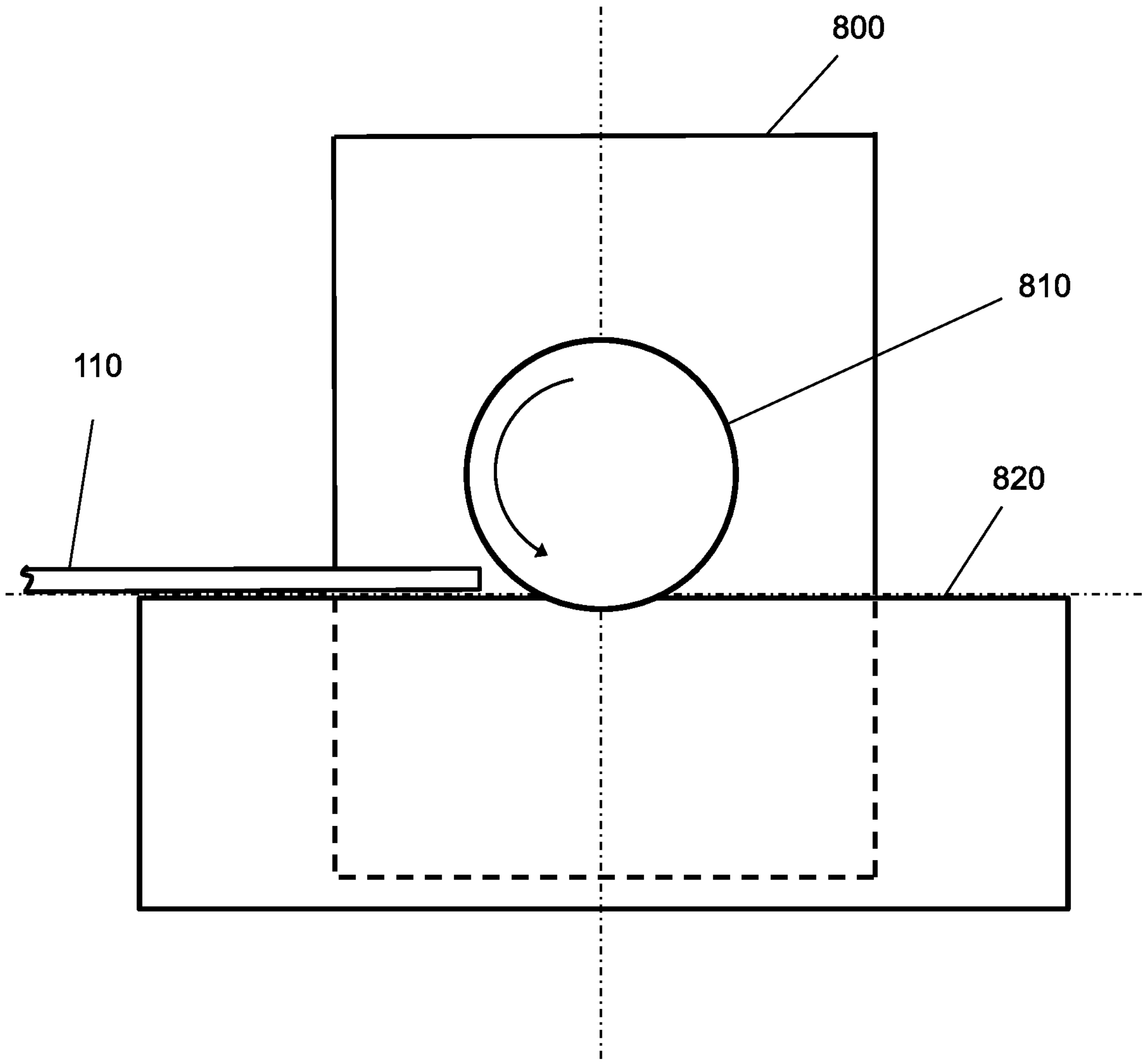
FIG. 8 is a schematic side view of a cutting module according to an example.

The first and second cutting modules may be implemented in various ways. In certain examples, the first and second cutting modules comprise linear cutters. In the example of FIG. 4*a*, the first and second cutting modules are active cutting modules meaning they can be activated during a cutting process and deactivated when not cutting. In one example, the first and/or second cutting modules include a linear cutter in the form of dual rotary blades. FIG. 7 shows an example schematic side view of such a cutting module 700 comprising an upper rotary blade 710 working in conjunction with a lower rotary blade 720. When the cutting module 700 is activated, the upper and lower rotary blades 710, 720 can be rotated in opposite directions to cut through print media 110 passing through the cutting module. In another example, the first and/or second cutting modules include a linear cutter in the form of a linear blade with a single rotary blade. FIG. 8 shows an example schematic side view of such a cutting module 800 comprising an upper rotary blade 810 working in conjunction with a lower fixed linear blade 820. When the cutting module 800 is activated, the upper rotary blade 810 can be rotated against the fixed linear blade 820 to cut through print media 110 passing through the cutting module.

In the example of FIG. 4*a*, the cutting system 400 also comprises a linear actuator 440 for moving and positioning the first cutting module 430 along the X axis. In one example, the linear actuator is physically coupled to the first cutting module 430. In one example, the linear actuator 440 may be a belt driven linear actuator. In another example, the linear actuator 440 may be a screw driven linear actuator. In certain examples, the movement and position of the linear actuator may be controlled by a servomotor or other electronically controllable device.

The cutting system 400 also comprises a controller 450 which is coupled to various elements of the cutting system including: the traction system 410 via the control line 452, the first cutting module 430 via the control line 454, the second cutting module 420 via the control line 456, and the linear actuator 440 via the control line 458.

In the example of FIGS. 4*a* to 4*f*, the controller 450 is configured to control and coordinate the various actions relating to the cutting procedure.

In the example of FIG. 4*a*, the print media 110 may be input to the cutting system 400 via an input interface. As discussed earlier, the print media 110 may be provided by a roll feed or from a stack of folded print media. A print medium 110 may be advanced along the print media path under control of the traction system 410. The controller 450 provides a signal along the signal line 452 to activate the traction system 410 to move the print media towards the first cutting module 430 in a media advance direction A. The controller 450 also provides a signal along the signal line 458 to activate the actuator 440 to move the first cutting module 430 to a correct position along the X axis. The correct position along the X axis may be specified by a print medium job such as the print medium job discussed in relation to FIG. 1*a*. After controlling the positioning of the first cutting module, the controller 450 also activates the first cutting module 430 via the signal line 454 ready for the advancing print media 110.

Figure 4B:
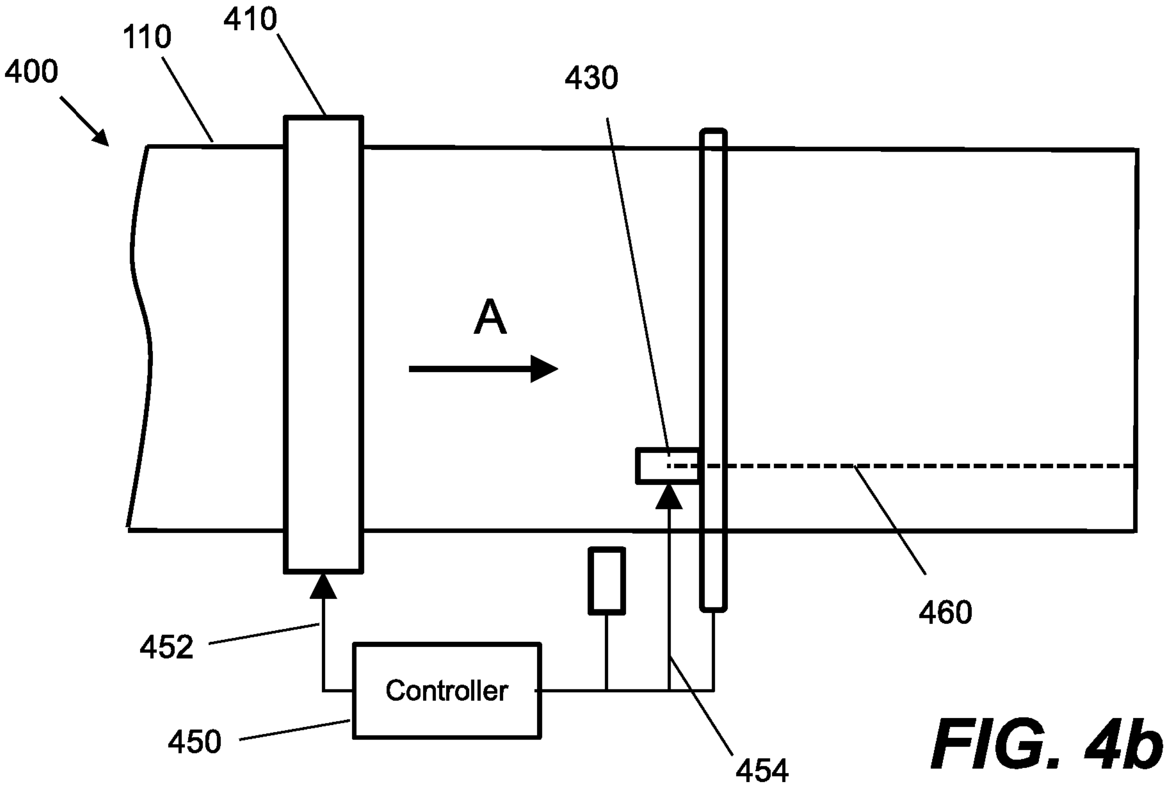

Referring now to FIG. 4*b*, the example cutting system 400 is shown advancing the print medium 110 through the activate first cutting module 430 by means of the traction system 410. In FIG. 4*b*, the controller 450 continues to advance the print medium 110 by providing a suitable signal over the signal line 452, and continues to activate the first cutting module 430 by providing a suitable signal over the signal line 454. The first cutter engages with the leading edge of the print media and continues to cut the print medium 110 as it advances. The longitudinal cut formed by the first cutting module 430 is illustrated by the dashed line 460 in FIG. 4*b*. Once the controller 450 and traction system 410 has advanced the print medium enough to complete the longitudinal cut 460, the controller 450 can stop the traction system and deactivate the first cutting module 430.

Figure 4C:
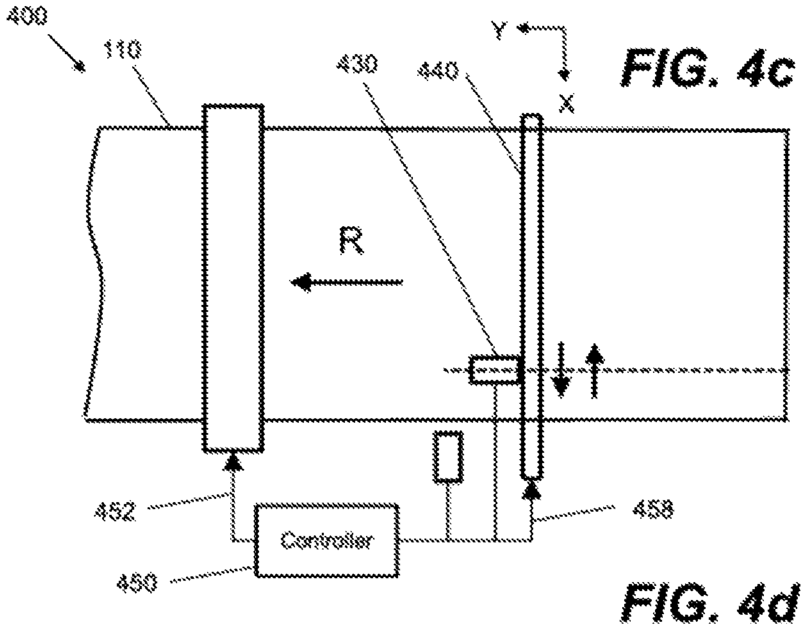

Referring now to FIG. 4*c*, the example cutting system 400 is shown reversing the print medium 110 under the action of the traction system 410. The reversing action of the traction system 410 can be controlled via a suitable signal from the controller 450 over the signal line 452. In the example where the traction system 410 is implemented as a pair of nip rollers driven by an electric motor, the signal from the controller can command the electric motor to operate in a reverse direction to reverse the operation of the nip rollers and pull the print medium 110 back along the print media path. At the same time as sending a signal to the traction system 410, the controller 450 also operates to send a suitable signal to the linear actuator 440 via the signal line 458. This signal on line 458 activates the linear actuator 440 to move the first cutting module 430 in the X axis direction at the same time as the traction system 410 moves the print medium 110 in the reverse direction. In certain examples, the movement of the first cutting module 430 is away from a printing job so as to avoid damage to the cut edge of the printing job. In one example, the movement of the first cutting module 430 along the X axis may be smaller than the reverse movement of the print medium 110 in the Y axis. In one example, the magnitude of the movement of the first cutting module 430 along the X axis may be approximately 5 mm while the movement of the print medium in the reverse direction may be approximately 30 mm.

Figure 9:
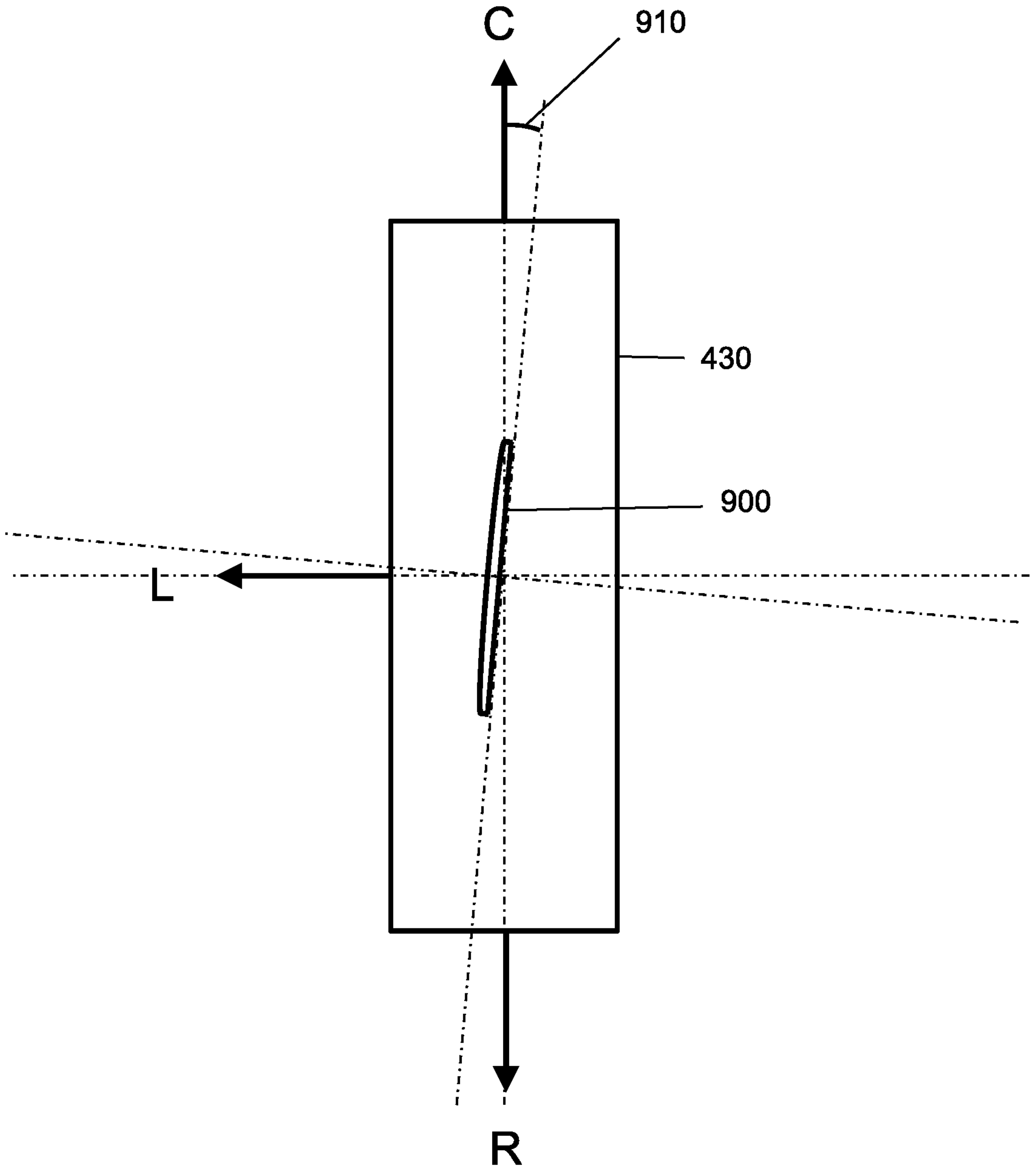
FIG. 9 is a schematic plan view of a cutting module according to an example.

As explained above, the first cutting module 430 may contain a rotary cutting blade to cut the print media in FIG. 4*b* before the print media is reversed in FIG. 4*c*. FIG. 9 shows a plan view of an example rotary cutting blade 900. The cutting direction of the first cutting module 430 is in the direction C parallel to the media advance direction. However, the vertical plane of the rotary cutter 900 is at a small angle 910 relative to the cutting direction C. The angle may improve the cutting quality of the first cutting module. In one example, the small angle 910 may be approximately 1 or 2 degrees. However, this angle 910 of the rotary cutter 900 may cause damage to the print media if the print medium is moved relative to the first cutting module in a direction R opposite to the cutting direction. In this example situation, a small simultaneous lateral movement L of the first cutting module can reduce the risk of damage to the print medium.

Referring back to FIG. 4*c*, after the controller 450 has completed the reverse movement of the print medium 110 and the lateral movement of the first cutting module 430, the controller sends a signal to the traction system 410 to stop movement of the print medium. According to certain examples, having stopped the print medium 110, the controller 450 can send a signal to the linear actuator 440 to move the first cutting module 430 back to the original position by moving the first cutting module in an opposite direction along the X axis by a distance equal to the distance moved by the first cutter module 430 during the reverse movement of the print medium 110.

Figure 4D:
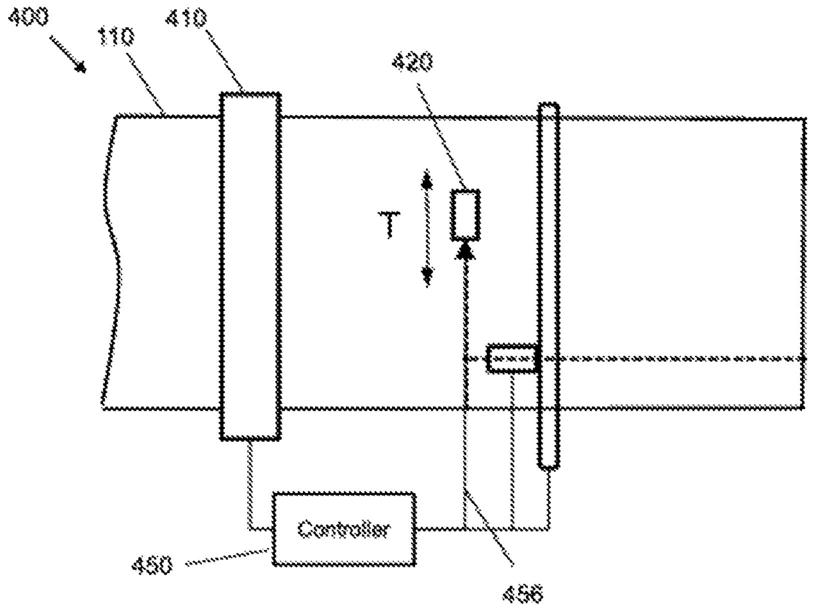

Referring now to FIG. 4*d*, the example cutting system 400 is shown performing a second transverse cut across the print medium 110. The controller 450 activates the second cutting module 420 via the signal line 456, after which the second cutting module moves transversely T across print medium 110. During this movement, the second cutting module engages with the print medium 110, cutting the print medium in the direction of the movement. Meanwhile, the print medium 110 is held in a stationary position by the grip of the traction system 410.

Figure 4E:
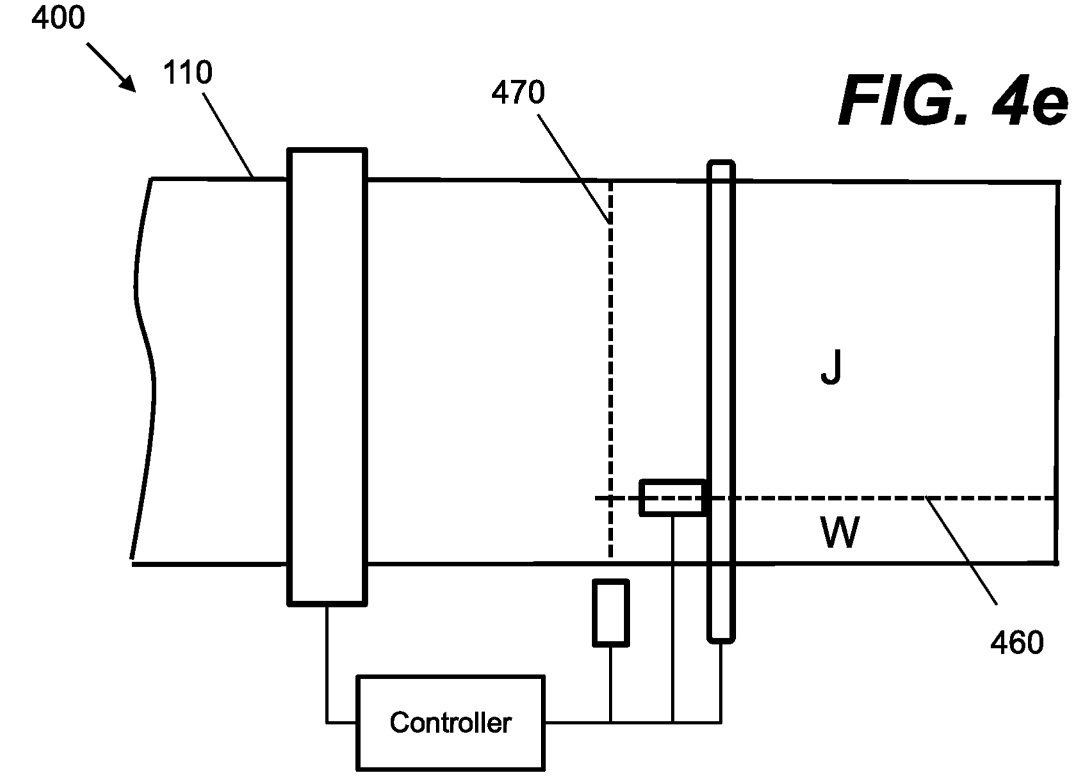

Once the second cutting module 430 is returned to the original position, the two cutting operations are complete as shown in FIG. 4*e*. The two generally perpendicular cuts 460, 470 may define the cut size of a print medium job J. In some examples, there may also be a waste media portion W.

Figure 4F:
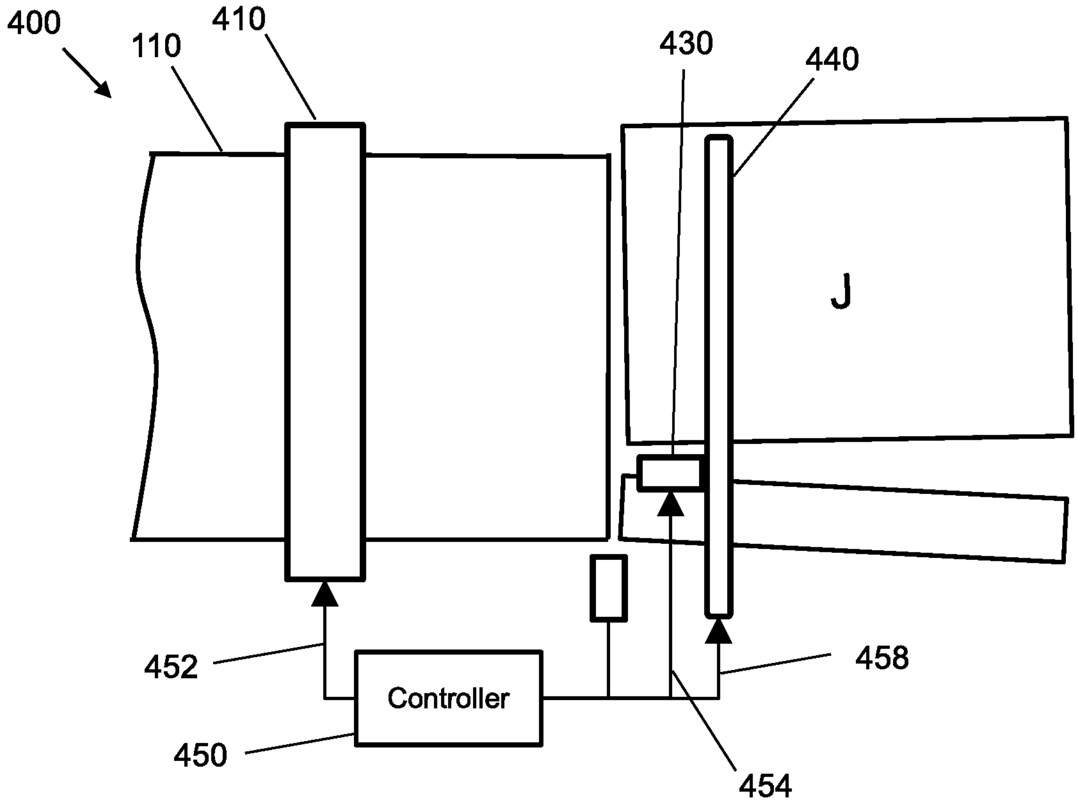

Referring now to FIG. 4*f*, in certain examples, the cutting system 400 may be configured to eject the cut print medium job or otherwise separate or dislodge the print medium job J from the remaining print medium 110. This can be achieved via one or more of the following procedures under the control of the controller 450:

1) Briefly activate the first cutting module 430, for example, via the control line 454;
2) Move the first cutting module 430 slightly in the transverse direction by, for example, activating the actuator 440 via the control line 458; and
3) Agitating the print medium 110 by, for example, suitable movement of the traction system 410 controlled via the control line 452.

In another example, the system of FIGS. 4*a* to 4*f* may be modified so that the controller 450 initially activates the traction system 410 to advance the leading edge of the print medium 110 beyond the cutting position of the second cutting module 420 (see FIG. 4*a*). Before the leading edge engages with the first cutting module 410, the traction system 410 stops the advance of the print medium 110, and the controller 450 activates the second cutting module 420 to make an initial transverse cut to create a new leading edge of the print medium. The procedure then continues to make a further longitudinal cut with the first cutting module, and a further transverse cut with the second cutting module as explained above. In this way, the cutting system 400 can perform three cuts on the print medium along the lines of the three cuts in FIG. 1*b*.

In another example, the system of FIGS. 4*a* to 4*f* may be modified to include a third cutting module that can be arranged to cut the print medium 110 in a longitudinal direction simultaneously with the first cutting module 430 as the print medium is advanced (see FIG. 4*b*). The first and the third cutting modules could be positioned at different positions along the X axis but at the same position on the Y axis. An additional linear actuator may be included to position and move the third cutting module independently of the first cutting module. The third cutting module can also be moved in a transverse direction simultaneously with the movement of the print medium 110 in the reverse direction (see FIG. 4*c*), and subsequently returned after the reverse procedure is stopped. In one example, the first and third cutting modules can be moved apart simultaneously with the movement of the print medium 11 in the transverse direction. In this way, the cutting system 400 can perform three cuts on the print medium along the lines of the three cuts in FIG. 1*c*.

In another example, the system 400 may be modified to include both the third cutting module described above, and the cutting procedure whereby the second cutting module 420 performs an initial transverse cut. In this way, the cutting system 400 can perform four cuts on the print medium along the lines of the four cuts in FIG. 1*d*.

Figure 5:
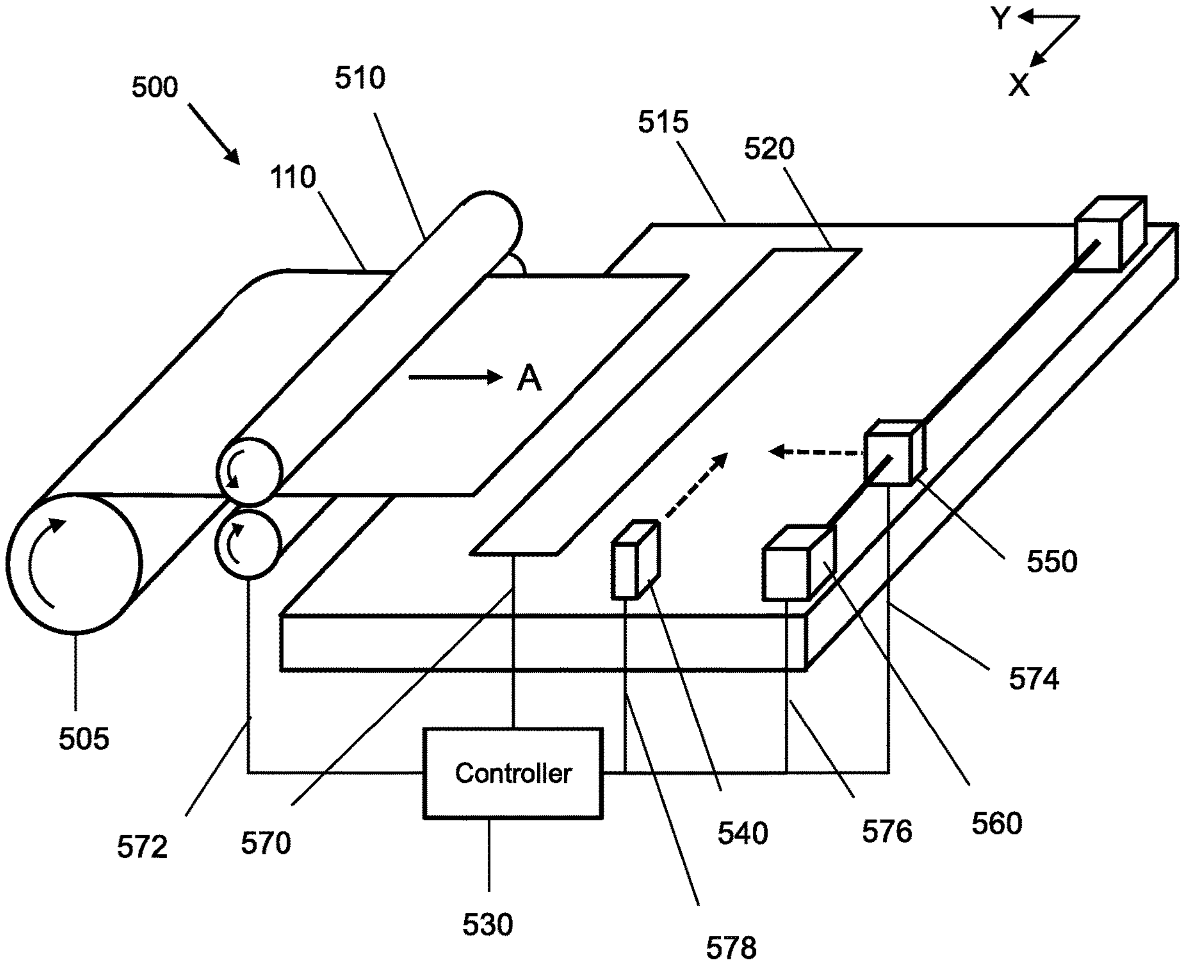
FIG. 5 is a schematic perspective view of a printing device with an integrated cutting system according to an example.

Referring now to FIG. 5, there is shown an example printing device 500 incorporating a cutting system. The printing device 500 comprises a roll sheet feed mechanism 505 for supplying continuous print media on demand to the printing device, a traction system comprising a pair of motorized pinch rollers 510, a platen 515, a print zone 520, a first cutting module 550 mounted on an actuator 560, a second cutting module 540, and a controller 530 for controller the operation of the printing device 500. In this example, the controller is coupled to the print zone 520, the pinch rollers 510, the first cutting module 550, the actuator 560, and the second cutting module 540 via control lines 570, 572, 574, 576, and 578.

The cutting system of the printing device may operate using the cutting procedures described above with reference to FIGS. 3*a* to 3*e* and 4*a* to 4*f*. The first cutting module 560 can be positioned and moved along the X axis using the actuator 560. In this example, the actuator 550 is implemented using a screw mechanism.

In the example of FIG. 5, the print media path begins with the roll sheet feed mechanism 505 which feeds print media to the motorized pinch rollers 510. The pinch rollers advance the print media along the print media path to the print zone 520, and on to a cutting region. The cutting region includes the second cutting module 540, and the first cutting module 550 mounted on the actuator 560.

The printzone 520 is positioned after the pinch rollers 510 and may comprise one or more printheads of the printing device 500 arranged to deposit printing fluid. The one or more printheads may be mounted within a moveable carriage that is translated above the continuous print media 110. In FIG. 5, a scan axis of such a moveable carriage may be the X axis. The one or more printheads may be removable and replaceable, for example, they may be loaded into the moveable carriage to allow printing and removed when a printing fluid supply is exhausted. In other cases, one or more printheads may form part of a page-wide array, e.g. that extends over the continuous print media 110 along the X axis. The printzone 520 may take a number of different forms depending on the implementation.

The controller 530 of FIG. 5 can operate to control the advance of the print media for the purpose of carrying out a printing operation in the printzone 520 for a print medium job. At the same time, the controller 530 can coordinate the cutting operation of the print medium job in tandem with the printing operation in the printzone 520. For example, the first cutting module can begin to cut the print medium job before the printzone has finished the printing operation. This may correspond to the cutting procedure of block 210 in FIG. 2, FIGS. 3*a* and 3*b*, and FIGS. 4*a* and 4*b*. In certain examples, the printing operation may finish before the first cut by the first cutting module is complete, and before the print medium is reversed during the cutting procedure.

The use of the same traction system 510 for the printing operation and the cutting procedure of the printing device 500 can reduce the complexity, size, and cost of the device in comparison to printing and cutting systems that may employ separate traction systems.

Figure 6:
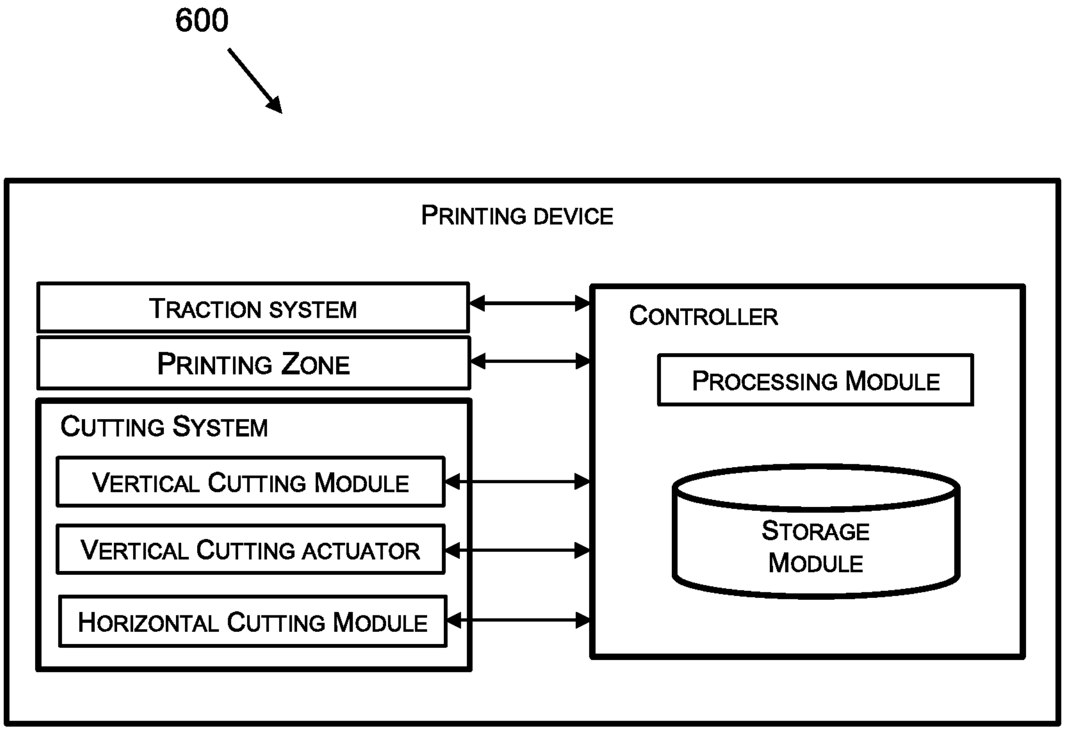
FIG. 6 is a schematic diagram of a printing system according to an example.

Referring now to FIG. 6, there is shown an example of a printing device 600 comprising a traction system, a printing zone, a cutter system, and a controller. The cutter system comprises a vertical cutting module similar to the first cutting module of FIG. 5, a vertical cutting actuator similar to the actuator of FIG. 5, and a horizontal cutting module similar to the second cutting module of FIG. 5. The controller is coupled via suitable interfaces to each of the functions of the printing device 600. The controller comprises a processing module that may comprise one more processors. The processing module is coupled to a storage module which may contain a set of instructions for operating the printing device. The storage module may contain a non-transitory machine-readable storage medium. The non-transitory machine-readable storage medium may be encoded with instructions executable by a processor of the processing module. The machine-readable storage medium may, for example, comprise a random access memory (RAM), a read only memory (ROM), flash memory or a hard disk drive. The set of instructions for operating the printing device may comprise instructions to cause a traction system to advance a print medium through the vertical cutting module to cut the print medium in a longitudinal direction; instructions to cause a traction system to reverse the print medium and to simultaneously move the vertical cutting module in a lateral direction; and instructions to move the horizontal cutting module across the print medium to cut the print medium in a transverse direction.

The preceding description has been presented only to illustrate and describe examples of the principles described. This description is not intended to be exhaustive or to limit these principles to any precise form disclosed. Features of individual examples may be combined in different configurations, including those not explicitly set out herein. Many modifications and variations are possible in light of the above teaching. Printing fluid, as described herein, may comprise inks, glosses, varnishes and the like.

The invention claimed is:

1. A method comprising:

moving a leading edge of a print medium in a media advance direction through a first cutter at a first time to form a first cut, the first cut having an end distal to the leading edge of the print medium, being completely through the print medium, and extending in a direction parallel to the media advance direction, moving the print medium in a reverse direction at a second time different from the first time, the reverse direction being opposite to the media advance direction so that a second cutter that is stationary during the second time and separate from the first cutter aligns with the first cut at a point on the first cut anywhere from beyond the leading edge of the print medium to the end distal to the leading edge of the print medium, and simultaneously moving the first cutter in a direction transverse to the media advance direction as the print medium is moved in the reverse direction, and cutting completely through the print medium with the second cutter that moves at a third time different from the first time and the second time in the direction transverse to the media advance direction to form a second cut in the print medium while the first cutter is stationary, the second cut extending transverse to the first cut, and the second cut intersecting the point of the first cut to separate the print medium into two parts.

2. The method of claim 1, comprising moving the first cutter in an opposite transverse direction after moving the print medium in the reverse direction.

3. The method of claim 2, comprising moving the first cutter again in the direction transverse to the media advance direction or the opposite transverse direction after cutting the print medium with the second cutter.

4. The method of claim 1, wherein cutting the print medium with the second cutter comprises moving the second cutter in the direction transverse to the media advance direction.

5. The method of claim 1, wherein the first cutter is positioned after the second cutter in the media advance direction.

6. The method of claim 1, comprising printing on the print medium.

7. The method of claim 6, wherein the printing on the print medium comprises simultaneously printing on the print medium as the print medium is advanced through the first cutter.

8. The method of claim 6, wherein the printing is completed before moving the print medium in the reverse direction.

9. The method of claim 1, wherein moving the leading edge of the print medium in the media advance direction through the first cutter comprises activating a traction system to advance the print medium, and activating the first cutter to perform a cutting operation.

10. The method of claim 9, wherein moving the print medium in the reverse direction opposite to the media advance direction comprises activating the traction system to reverse the print medium.

11. The method of claim 1, wherein the second cutter extends in the direction transverse to the media advance direction at a length from the leading edge of the print medium substantially the same as a length of the first cut from the leading edge of the print medium.

12. A device comprising:

a traction system to move a print medium having a leading edge in media advance and reverse directions, a first cutting module to cut the print medium in a direction parallel to the media advance direction, an actuator to move the first cutting module in a direction transverse to the media advance direction, a second cutting module to move and cut the print medium in the direction transverse to the media advance direction, and a controller to activate both the traction system and the actuator, wherein the controller includes instructions to cut-out a portion of the print medium by carrying out steps including:

forming a first cut completely through the print medium at a first time with the first cutting module, where the first cut is in the direction parallel to the media advance direction, and where the first cut has an end distal to leading edge of the print medium;

at a second time different from the first time, moving the print medium in the reverse direction and at the same time moving the first cutting module in the direction transverse to the media advance direction while the second cutting module is stationary; and at a third time different from the first time and the second time, forming a second cut completely through the print medium with the second cutting module, where the second cut extends transverse to the first cut and intersects the first cut at a point on the first cut beyond the leading edge of the print medium to the end distal to the leading edge of the print medium, and maintaining the first cutting module stationary during the third time.

13. The printing device of claim 12, wherein the second cutting module is positioned before the first cutting module.

14. The device of claim 12, wherein the traction system is positioned before the first and second cutting modules.

15. The device of claim 12, wherein the second cutting module extends in the direction transverse to the media advance direction at a length from the leading edge of the print medium substantially the same as a length of the first cut from the leading edge of the print medium.

* * * * *